United States Patent
Mow et al.

(10) Patent No.: US 9,673,916 B2
(45) Date of Patent: Jun. 6, 2017

(54) ELECTRONIC DEVICE WITH OVER-THE-AIR WIRELESS SELF-TESTING CAPABILITIES

(71) Applicant: Apple Inc., Cupertino, CA (US)

(72) Inventors: Matthew A. Mow, Los Altos, CA (US); Basim Noori, San Jose, CA (US); Yuehui Ouyang, Sunnyvale, CA (US); Yi Jiang, Sunnyvale, CA (US); Mattia Pascolini, San Francisco, CA (US); Ruben Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/097,873

(22) Filed: Apr. 13, 2016

(65) Prior Publication Data

US 2016/0308626 A1 Oct. 20, 2016

Related U.S. Application Data

(60) Provisional application No. 62/149,405, filed on Apr. 17, 2015.

(51) Int. Cl.
| | | |
|---|---|---|
| *H04B 17/00* | (2015.01) | |
| *H04B 17/19* | (2015.01) | |
| *H04B 17/14* | (2015.01) | |

(52) U.S. Cl.
CPC ............ *H04B 17/19* (2015.01); *H04B 17/14* (2015.01)

(58) Field of Classification Search
CPC .... H04B 17/21; H04B 7/0608; H04B 7/0413; H04B 17/12; H04B 17/309; H04B 17/318; H04B 7/0682; H04W 52/0245

USPC ............... 455/101, 562.1, 67.11, 139, 276.1; 342/423, 434
See application file for complete search history.

(56) References Cited

U.S. PATENT DOCUMENTS

| | | | |
|---|---|---|---|
| 6,529,746 B1 | 3/2003 | Kotzin | |
| 7,453,405 B2 * | 11/2008 | Nishikido | H01Q 1/242 343/700 MS |
| 7,511,681 B2 | 3/2009 | Bolin | |
| 8,891,598 B1 * | 11/2014 | Wang | H04L 25/0398 370/241 |
| 2011/0068990 A1 * | 3/2011 | Grzyb | H01P 1/042 343/772 |

(Continued)

*Primary Examiner* — Sonny Trinh
(74) *Attorney, Agent, or Firm* — Treyz Law Group, P.C.; G. Victor Treyz; Michael H. Lyons

(57) ABSTRACT

An electronic device may be provided with wireless circuitry. The wireless circuitry may include antennas. The antennas may include phased antenna arrays for handling millimeter wave signals. Antennas may be located in antenna signal paths. The antenna signal paths may include adjustable components such as adjustable filters, adjustable gain amplifiers, and adjustable phase shifters. Circuitry may be incorporated into an electronic device to facilitate wireless self-testing operations. Wireless self-testing may involve use of one antenna to transmit an over-the-air antenna test signal that is received by another antenna. The circuitry that facilitates the wireless self-testing operations may include couplers, adjustable switches for temporarily shorting antenna signal paths together, mixers for mixing down radio-frequency signals to allow digitization with analog-to-digital converters, and other circuitry for supporting self-testing operations.

18 Claims, 9 Drawing Sheets

(56) References Cited

U.S. PATENT DOCUMENTS

| | | | |
|---|---|---|---|
| 2013/0027250 A1* | 1/2013 | Chen | G01S 3/56 342/368 |
| 2013/0217343 A1 | 8/2013 | Tenbroek et al. | |
| 2014/0242918 A1 | 8/2014 | Weissman et al. | |
| 2016/0087734 A1 | 3/2016 | Kordik et al. | |

* cited by examiner

ELECTRONIC DEVICE WITH OVER-THE-AIR WIRELESS SELF-TESTING CAPABILITIES

This application claims to benefit of provisional patent application No. 62/149,405, filed Apr. 17, 2015, which is hereby incorporated by reference herein in its entirety.

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

The wireless performance of an electronic device can be affected by manufacturing variations. As a result, many wireless electronic devices are tested during manufacturing. As an example, a wireless device may be placed in a test chamber to that has test antennas coupled to wireless test equipment. Tests may be performed on the wireless device while the wireless device is in the test chamber. Tests measurements such as these may be used to characterize antenna performance and to perform wireless circuit calibration.

It can be challenging to effectively characterize wireless electronic devices during manufacturing. Wireless devices may be produced in large volumes. Unless care is taken, the expense and complexity of installing and operating sufficient wireless test equipment to handle large volumes of devices can be prohibitive.

It would therefore be desirable to be able to provide improved arrangements for wirelessly testing electronic devices.

SUMMARY

An electronic device may be provided with wireless circuitry. The electronic device may be a portable electronic device such as a cellular telephone, laptop computer, or tablet computer, or may be other electronic equipment.

The wireless circuitry may include antennas. The antennas may include phased antenna arrays for handling millimeter wave signals. The wireless circuitry may also include antennas of other types such as cellular telephone antennas, wireless local area network antennas, and satellite navigation system antennas.

Antennas may be located in antenna signal paths. The antenna signal paths may include adjustable components such as adjustable filters, adjustable gain amplifiers, and adjustable phase shifters. During operation, these adjustable components may be adjusted to implement beam steering functions and other wireless functions.

Circuitry may be incorporated into the wireless circuitry of an electronic device to facilitate wireless self-testing operations. Wireless self-testing may involve use of one antenna in an electronic device to transmit an over-the-air antenna signal that is received by another antenna in the electronic device. The circuitry that facilitates the wireless self-testing operations may include couplers, adjustable switches for temporarily shorting antenna signal paths together, mixers for mixing down radio-frequency signals to allow digitization with analog-to-digital converters, and other circuitry for supporting self-testing operations.

DETAILED DESCRIPTION

Figure 1:
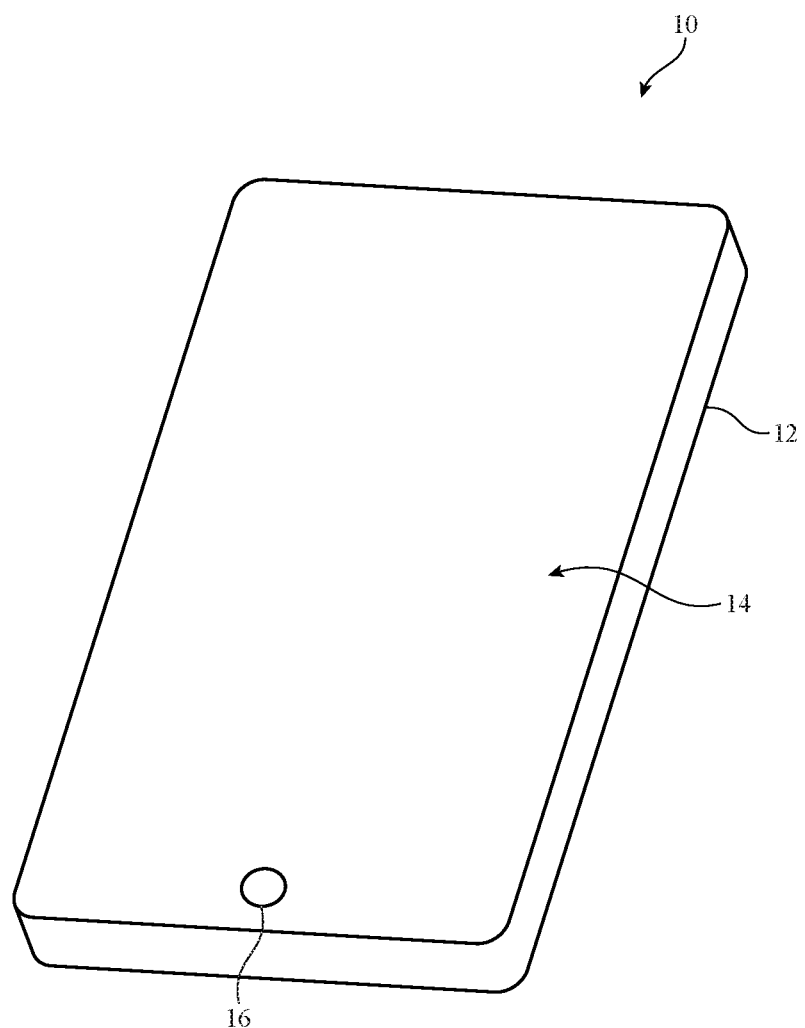
FIG. 1 is a perspective view of an illustrative electronic device with wireless communications circuitry in accordance with an embodiment.

An electronic device such as electronic device 10 of FIG. 1 may contain wireless circuitry. The wireless circuitry may include one or more antennas. The antennas may include phased antenna arrays that are used for handling millimeter wave communications. Millimeter wave communications, which are sometimes referred to as extremely high frequency (EHF) communications, involve signals at 60 GHz or other frequencies between about 10 GHz and 400 GHz. Device 10 may also contain wireless communications circuitry for handling satellite navigation system signals, cellular telephone signals, local wireless area network signals, near-field communications, light-based wireless communications, or other wireless communications.

Electronic device 10 may be a computing device such as a laptop computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer monitor containing an embedded computer, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, or other portable computing device. Other configurations may be used for device 10 if desired. The example of FIG. 1 is merely illustrative.

As shown in FIG. 1, device 10 may include a display such as display 14. Display 14 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 14 may be protected using a display cover layer such as a layer of transparent glass, clear plastic, sapphire, or other transparent dielectric. Openings may be formed in the display cover layer. For example, an opening may be formed in the display cover layer to accommodate a button such as button 16. An opening may also be formed in the display cover layer to accommodate ports such as a speaker port. Openings may be formed in housing 12 to form communications ports (e.g., an audio jack port, a digital data port, etc.). Openings in housing 12 may also be formed for audio components such as a speaker and/or a microphone.

Antennas may be mounted in housing 12. To avoid disrupting communications when an external object such as a human hand or other body part of a user blocks one or more antennas, antennas may be mounted at multiple locations in housing 12. Sensor data such as proximity sensor data, real-time antenna impedance measurements, signal quality measurements such as received signal strength information, and other data may be used in determining when an antenna (or set of antennas) is being adversely affected due to the orientation of housing 12, blockage by a user's hand or other external object, or other environmental factors. Device 10 can then switch an antenna (or set of antennas) into use in place of the antennas that are being adversely affected.

Antennas may be mounted along the peripheral edges of housing 12, on the rear of housing 12, under the display cover glass or other dielectric display cover layer that is used in covering and protecting display 14 on the front of device 10, under a dielectric window on a rear face of housing 12 or the edge of housing 12, or elsewhere in device 10.

Figure 2:
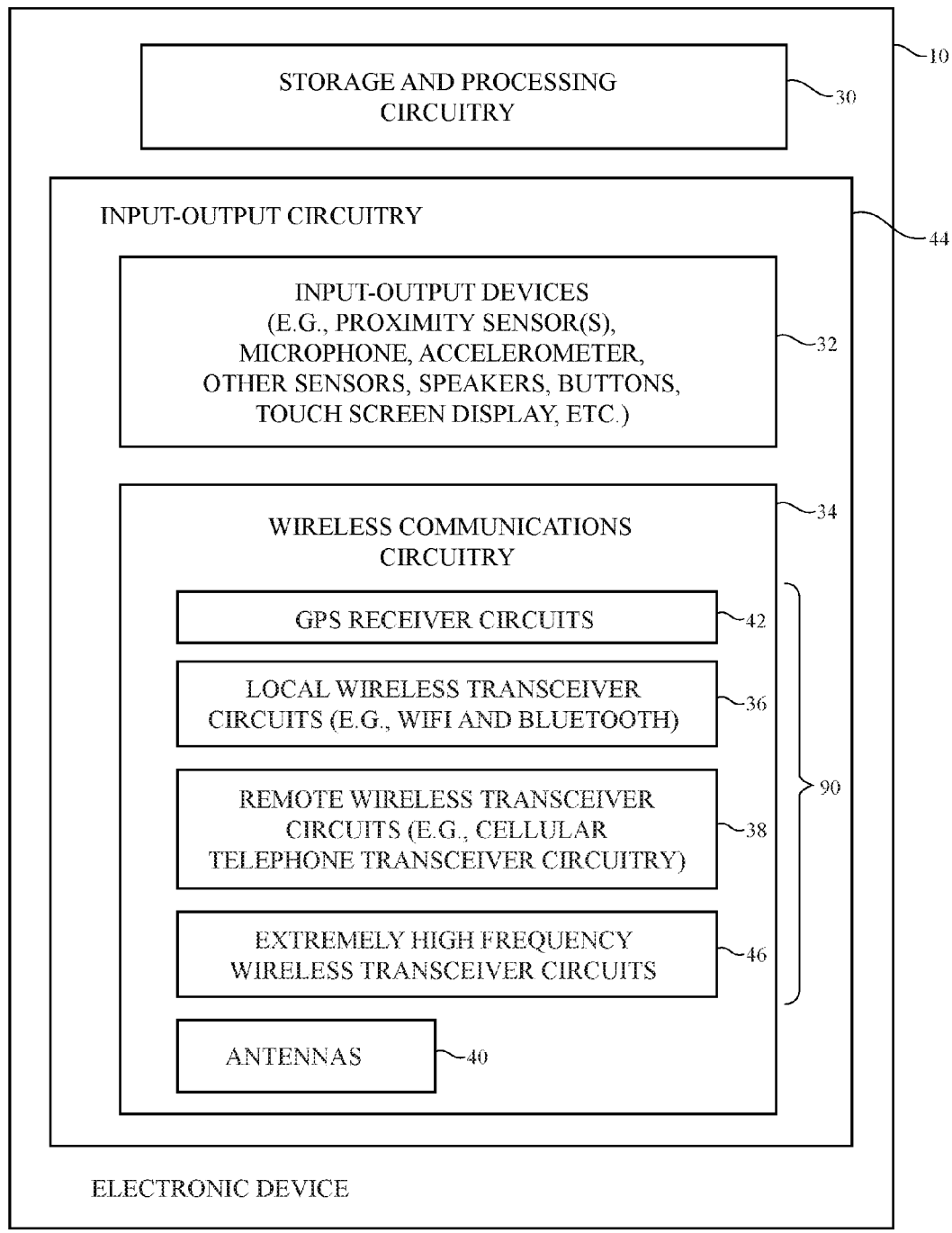
FIG. 2 is a schematic diagram of an illustrative electronic device with wireless communications circuitry in accordance with an embodiment.

A schematic diagram showing illustrative components that may be used in device 10 is shown in FIG. 2. As shown in FIG. 2, device 10 may include control circuitry such as storage and processing circuitry 30. Storage and processing circuitry 30 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 30 may be used to control the operation of device 10. This processing circuitry may be based on one or more microprocessors, microcontrollers, digital signal processors, baseband processor integrated circuits, application specific integrated circuits, etc.

Storage and processing circuitry 30 may be used to run software on device 10, such as internet browsing applications, voice-over-internet-protocol (VOIP) telephone call applications, email applications, media playback applications, operating system functions, etc. To support interactions with external equipment, storage and processing circuitry 30 may be used in implementing communications protocols. Communications protocols that may be implemented using storage and processing circuitry 30 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, satellite navigation system protocols, etc.

Device 10 may include input-output circuitry 44. Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers or other components that can detect motion and device orientation relative to the Earth, capacitance sensors, proximity sensors (e.g., a capacitive proximity sensor and/or an infrared proximity sensor), magnetic sensors, a connector port sensor or other sensor that determines whether device 10 is mounted in a dock, and other sensors and input-output components.

Input-output circuitry 44 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas 40, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36, 38, 42, and 46.

Transceiver circuitry 36 may be wireless local area network transceiver circuitry that may handle 2.4 GHz and 5 GHz bands for WiFi® (IEEE 802.11) communications and that may handle the 2.4 GHz Bluetooth® communications band.

Circuitry 34 may use cellular telephone transceiver circuitry 38 for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 38 may handle voice data and non-voice data.

Millimeter wave transceiver circuitry 46 may support communications at extremely high frequencies (e.g., millimeter wave frequencies from 10 GHz to 400 GHz or other millimeter wave frequencies).

Wireless communications circuitry 34 may include satellite navigation system circuitry such as Global Positioning System (GPS) receiver circuitry 42 for receiving GPS signals at 1575 MHz or for handling other satellite positioning data (e.g., GLONASS signals at 1609 MHz). Satellite navigation system signals for receiver 42 are received from a constellation of satellites orbiting the earth.

In satellite navigation system links, cellular telephone links, and other long-range links, wireless signals are typically used to convey data over thousands of feet or miles. In WiFi® and Bluetooth® links and other short-range wireless links, wireless signals are typically used to convey data over tens or hundreds of feet. Extremely high frequency (EHF) wireless transceiver circuitry 46 may convey signals over these over these short distances that travel between transmitter and receiver over a line-of-sight path. To enhance signal reception for millimeter wave communications, phased antenna arrays and beam steering techniques may be used. Antenna diversity schemes may also be used to ensure that the antennas that have become blocked or that are otherwise degraded due to the operating environment of device 10 can be switched out of use and higher-performing antennas used in their place.

Wireless communications circuitry 34 can include circuitry for other short-range and long-range wireless links if desired. For example, wireless communications circuitry 34 may include circuitry for receiving television and radio signals, paging system transceivers, near field communications (NFC) circuitry, etc.

Antennas 40 in wireless communications circuitry 34 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. If desired, one or more of antennas 40 may be cavity-backed antennas. Different types of antennas may be used for different bands and combinations of bands. For example, one type of antenna may be used in forming a local wireless link antenna and another type of antenna may be used in forming a remote wireless link antenna. Dedicated antennas may be used for receiving satellite navigation system signals or, if desired, antennas 40 can be configured to receive both satellite navigation system signals and signals for other communications bands (e.g., wireless local area network signals and/or cellular telephone signals). Antennas 40 can include phased antenna arrays for handling millimeter wave communications.

Transmission line paths may be used to route antenna signals within device 10. For example, transmission line paths may be used to couple antenna structures 40 to transceiver circuitry 90. Transmission lines in device 10 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within the transmission lines, if desired.

Device 10 may contain multiple antennas 40. The antennas may be used together or one of the antennas may be switched into use while other antenna(s) are switched out of use. If desired, control circuitry 30 may be used to select an optimum antenna to use in device 10 in real time and/or to select an optimum setting for adjustable wireless circuitry associated with one or more of antennas 40. Antenna adjustments may be made to tune antennas to perform in desired frequency ranges, to perform beam steering with a phased antenna array, and to otherwise optimize antenna performance. Sensors may be incorporated into antennas 40 to gather sensor data in real time that is used in adjusting antennas 40.

In some configurations, antennas 40 may include antenna arrays. For example, the antennas that are used in handling millimeter wave signals for extremely high frequency wireless transceiver circuits 46 may be implemented as phased antenna arrays. The radiating elements in a phased antenna array for supporting millimeter wave communications may be patch antennas, dipole antennas, or other suitable antenna elements. Transceiver circuitry can be integrated with the phased antenna arrays to form integrated phased antenna array and transceiver circuit modules.

In devices such as handheld devices, the presence of an external object such as the hand of a user or a table or other surface on which a device is resting has a potential to block wireless signals such as millimeter wave signals or signals at other frequencies. Wireless performance can also be affected by the orientation of an antenna relative to the surroundings of device 10. Accordingly, it may be desirable to incorporate multiple antennas within device 10, each of which may be placed in a different location within device 10. The antennas may be single antennas, phased antenna arrays or antenna elements within a phased antenna array, or other antennas. With this type of arrangement, control circuitry in device 10 such as control circuitry 30 may determine which antenna(s) to switch into use during operation to optimize wireless performance (e.g., to switch unblocked antennas into use, to perform beam steering operations for phased antenna arrays, etc.).

Figure 3:
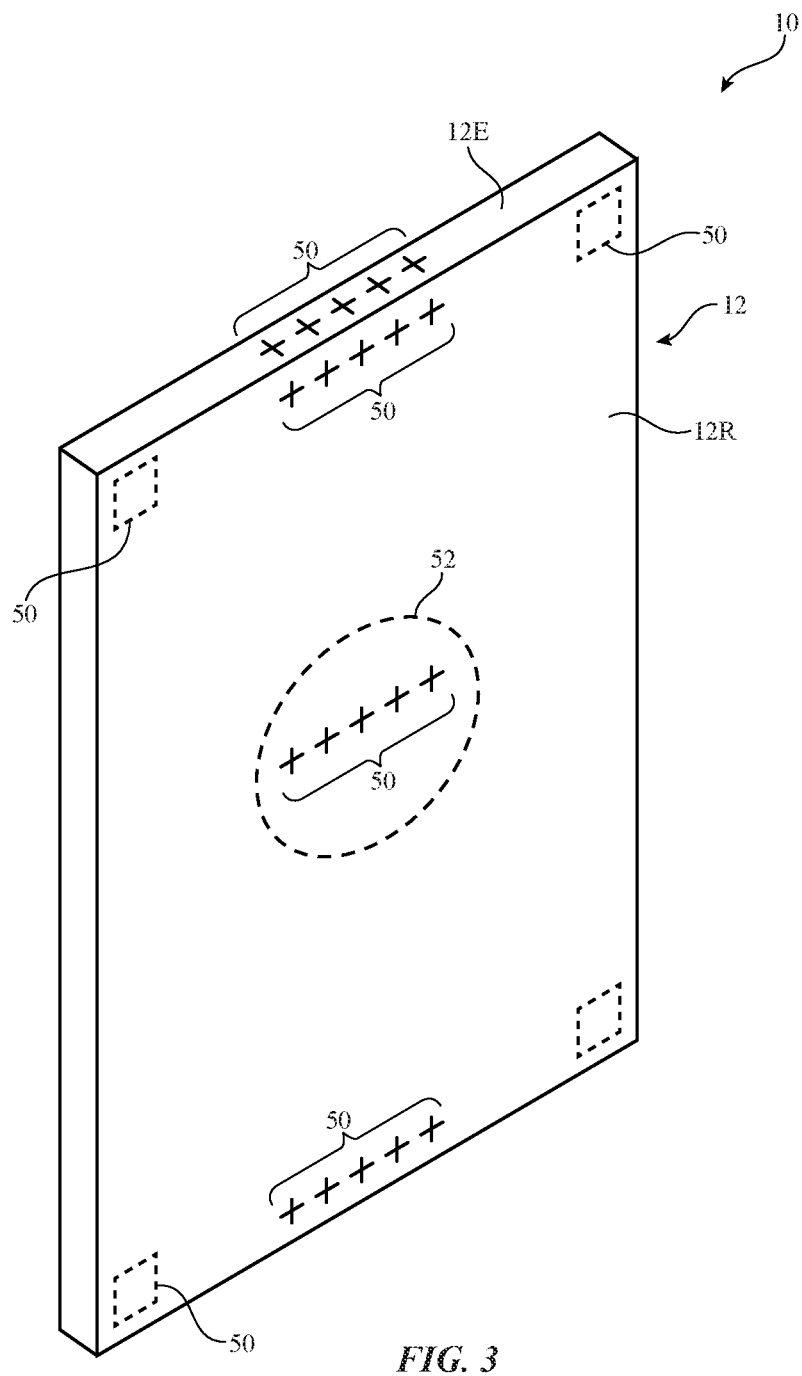
FIG. 3 is a perspective view of an illustrative electronic device showing illustrative locations at which antenna arrays for millimeter wave communications may be located in accordance with an embodiment.

FIG. 3 is a perspective view of electronic device showing illustrative locations 50 in which antennas 40 (e.g., single antennas and/or phased antenna arrays for use with wireless circuitry 34 such as millimeter wave wireless transceiver circuitry 46) may be mounted in device 10. As shown in FIG. 3, antennas 40 may be mounted at the corners of device 10, along the edges of housing 12 such as edge 12E, on the upper and lower portions of rear housing portion 12R, in the center of rear housing 12 (e.g., under a dielectric window structure such as plastic logo 52), etc. In configurations in which housing 12 is formed from a dielectric, antennas 40 may transmit and receive antenna signals through the dielectric. In configurations in which housing 12 is formed from a conductive material such as metal, slots or other openings may be formed in the metal that are filled with plastic or other dielectric. Antennas 40 may be mounted in alignment with the dielectric (i.e., the dielectric in housing 12 may serve as one or more antenna windows for antennas 40).

Figure 4:
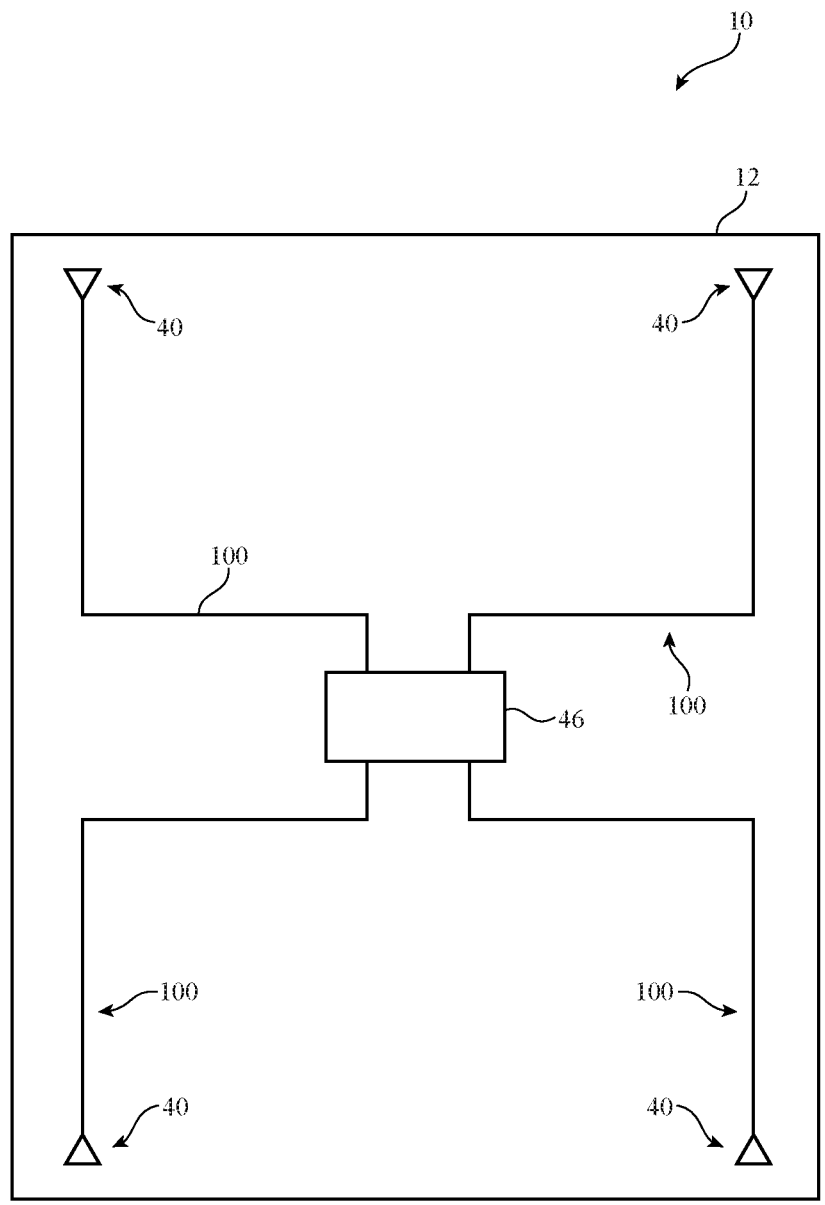
FIG. 4 is a diagram of an illustrative electronic device with wireless circuitry that distributes antenna signals to multiple antennas in accordance with an embodiment.

Signal paths such as paths 100 of FIG. 4 (e.g., transmission lines) may be used to distribute radio-frequency and/or intermediate frequency signals to antennas 40. Antennas 40 may include single antennas (single band, multi-band, etc.) and/or may include antenna arrays (e.g., phased antenna arrays) for handling millimeter wave signals (i.e., radio-frequency signals at RF frequencies such as 60 GHz). If desired, paths 100 may be configured to form a ring-shaped path. The illustrative network of antenna signal distribution paths 100 that is shown in FIG. 4 is merely illustrative.

Antennas 40 may be located at the corners of device housing 12 of device 10 or may be located elsewhere within device 10 as described in connection with FIG. 3. Transceiver circuitry 46 may be located in a central location within housing 12 (e.g., in the center of housing 12 as shown in FIG. 4) or may be located in other portions of housing 12. For example, portions of transceiver circuitry 46 may be co-located with antennas 40 (e.g., in a configuration in which each antenna array has local transceiver circuitry that communicates with a shared baseband processor). The configuration of FIG. 4 is merely illustrative.

To ensure that the wireless performance of device 10 is satisfactory, device 10 may be tested. As an example, control circuitry 30 may be used to run test software that directs wireless communications circuitry 34 to transmit and receive wireless signals during testing. Some wireless signals may be conveyed to external wireless test equipment. For example, some tests for device 10 may be performed by placing device 10 in a shielded wireless test chamber. The chamber may include test antennas. Wireless test equipment that is coupled to the test antennas may be used to wirelessly communicate with device 10 (e.g., the wireless test equipment and test antennas in the test chamber may be used to perform wireless over-the-air tests on device 10). This type of wireless characterization procedure may be performed on representative devices 10 or on all devices 10 during manufacturing. Testing may identify faulty devices that are to be reworked or discarded and/or may be used in creating calibration data that is stored within devices 10 to calibrate devices 10.

If desired, device 10 can also be wirelessly tested using over-the-air wireless test measurements that involve transmission and reception of wireless signals using only a transmitting antenna in device 10 and receiving antenna in device 10. With this type of approach, control circuitry 30 directs wireless communications circuitry 34 to transmit test signals with a first antenna 40 while control circuitry 30 directs communications circuitry 34 to simultaneously receive the transmitted test signals with a second antenna 40. The transmit and receive antennas of device 10 may be located at different portions of device 10 such as at different corners of housing 12 or may be located at different positions within a common antenna array (i.e., the transmit and receive antennas during a test may both be located within a common phased antenna array). In some tests, the identities of the transmit and receive antennas may be swapped (i.e., the antennas that were used as transmitting and receiving antennas may be used as receiving and transmitting antennas, respectively). Using measurements such as these, wireless circuit components such as phase shifters, filters, and amplifiers may be calibrated, antennas can be tested (e.g., to determine whether the antennas are properly coupled to their signal paths, to calibrate antenna tuning settings, etc.), and other wireless circuit measurements may be made. Examples of tests and measurements that may be performed by circuitry 30 in device 10 while transmitting antenna signals with a first antenna in device 10 and receiving the transmitted antenna signals with a second antenna in device 10 include, error vector magnitude measurements, radio-frequency bandwidth measurements, S-parameter measurements, receiver noise floor measurements, linearity, receiver blocking, etc.

Wireless circuitry 34 may include circuitry to facilitate loopback testing. As an example, a loopback circuit may be implemented to facilitate intermediate frequency (IF) signal quality and delay normalization measurements. If desired, an external tester may be used to calibrate a first antenna signal path (e.g., by inserting a probe into the path) before performing over-the-air tests or other wireless tests in which the first antenna signal path transmits signals that are received using a second antenna signal path. Couplers may be incorporated into the antenna signal paths of device 10 (e.g., to make S-parameter measurements). Mixing circuitry may be used to mix received radio-frequency signals down to direct-current (DC) levels suitable for digitization with analog-to-digital converter circuitry. Digitized signals can then be analyze by control circuitry 30.

Using arrangements such as these or other suitable arrangements, multiple antenna signal paths in device 10 can be characterized and associated calibration data stored in device 10. Initially a first path (and the components in that path) may be characterized. Using wireless communications between an antenna in the first path and an antenna in a second path, a second path may be calibrated using the known characteristics of the first path, and so forth, until all desired antenna signal paths in device 10 have been calibrated.

Figure 5:
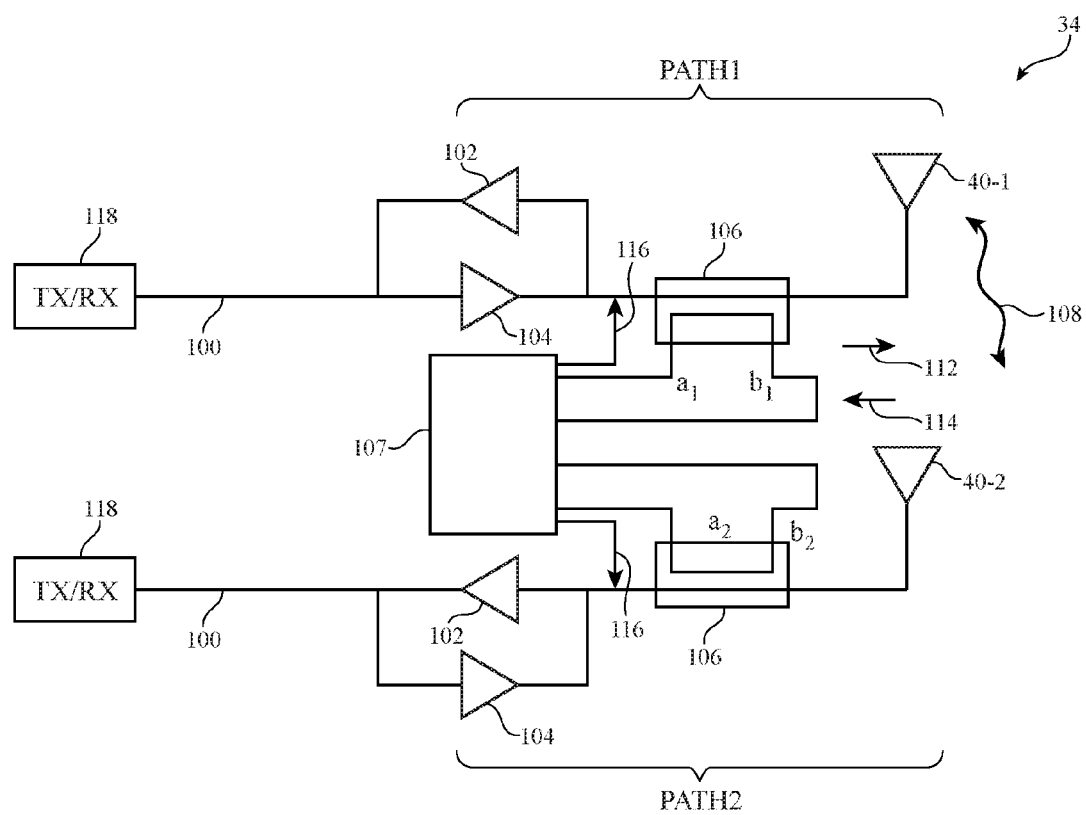
FIG. 5 is a diagram of an illustrative pair of signal paths with associated antennas that may be used in performing wireless characterization measurements such as S-parameter measurements in accordance with an embodiment.

Consider, as an example, the illustrative configuration of FIG. 5. As shown in FIG. 5, wireless circuitry 34 in device 10 may include multiple antennas such as antennas 40-1 and 40-2. Antennas 40-1 and 40-2 may be mounted at different corners of device housing 12, may be part of a common phased antenna array, or may be any other two antennas in device 10.

Antenna 40-1 may form part of antenna signal path PATH1 and antenna 40-2 may form part of antenna signal path PATH2. Paths PATH1 and PATH2 may be coupled to wireless transceiver circuitry 118 (e.g., transmitter and receiver circuitry and associated baseband processor circuitry) via paths 100.

Each of the antenna signal paths of FIG. 5 may include electrical components such as output amplifiers 104, input amplifiers 102, phase shifters, filters, etc. Switching circuitry 107 may be coupled to ports a1, b1, a2, and b2 of couplers 106 and may be configured to selectively route signals from any selected one of these ports to a desired output path 116. Paths 116 may be coupled to paths 100 so that signals from paths 116 may be received and measured using the receivers of transceiver circuitry 118.

Couplers 106 may be used to measure signals traveling in directions 112 and 114 on path PATH1 and path PATH2. During testing, switching circuitry 107 may be adjusted by the control circuitry of device 10 to couple desired coupler ports to paths 116. For example, switching circuitry 107 may be used to route signals from the coupler in PATH1 to the receiver associated with path PATH2 via the path 116 that is coupled to PATH2, so that those signals can be measured by that receiver. Using techniques such as these, S-parameter measurements can be made in wireless circuitry 34.

Figure 6:
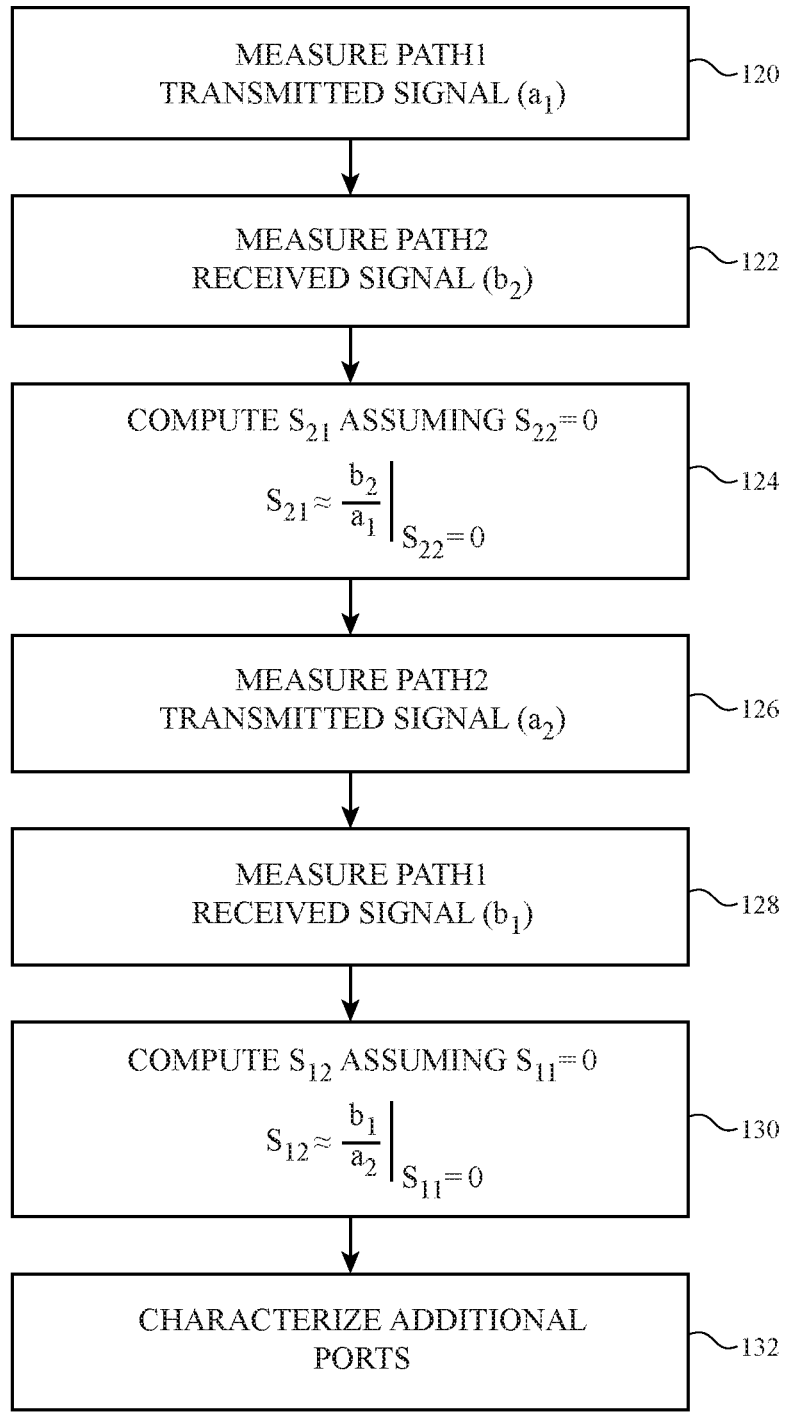
FIG. 6 is a flow chart of illustrative steps involved in making S-parameter measurements using wireless circuitry of the type shown in FIG. 5 in accordance with an embodiment.

A flow chart of illustrative steps involved in using circuitry of the type shown in FIG. 5 to make S-parameter measurements on paths PATH1 and PATH2 are shown in FIG. 6.

At step 120, the transmitter associated with path PATH1 may be used to transmit signals through antenna 40-1. While transmitting, switch 107 may be used to couple port a1 of the coupler 106 in path PATH1 to the receiver associated with path PATH2, so that the signal from port a1 (which is proportional to the PATH1 transmitted signal) can be measured.

As illustrated by wireless signals 108, the signal that is wirelessly transmitted by path PATH1, is received over the air by antenna 40-2 in path PATH2. Accordingly, at step 122, switch 107 may be configured to allow signal b2 (which is proportional to the PATH2 received signal) to be measured.

At step 124, control circuitry 30 may compute S-parameter $S_{21}$ by calculating the ratio of measured values on ports b2 and a1.

The S-parameter $S_{12}$ may be measured similarly. Switching circuitry 107 is first configured to allow the signal on port a2 of the coupler in path PATH2 to be measured using the receiver in path PATH1 (step 126). The signal on port b1 may then be measured (step 128). At step 130, the ratio of the measured signals on ports b1 and a2 may be computed to determine S-parameter $S_{12}$. As indicated by step 132, additional S-parameter measurements can be made in the same fashion (e.g., by transmitting signals on one antenna while receiving signals with another antenna). If desired, all antenna signal paths in device 10 may be characterized using this type of self-testing scheme, thereby minimizing the use of external test equipment.

Figure 7:
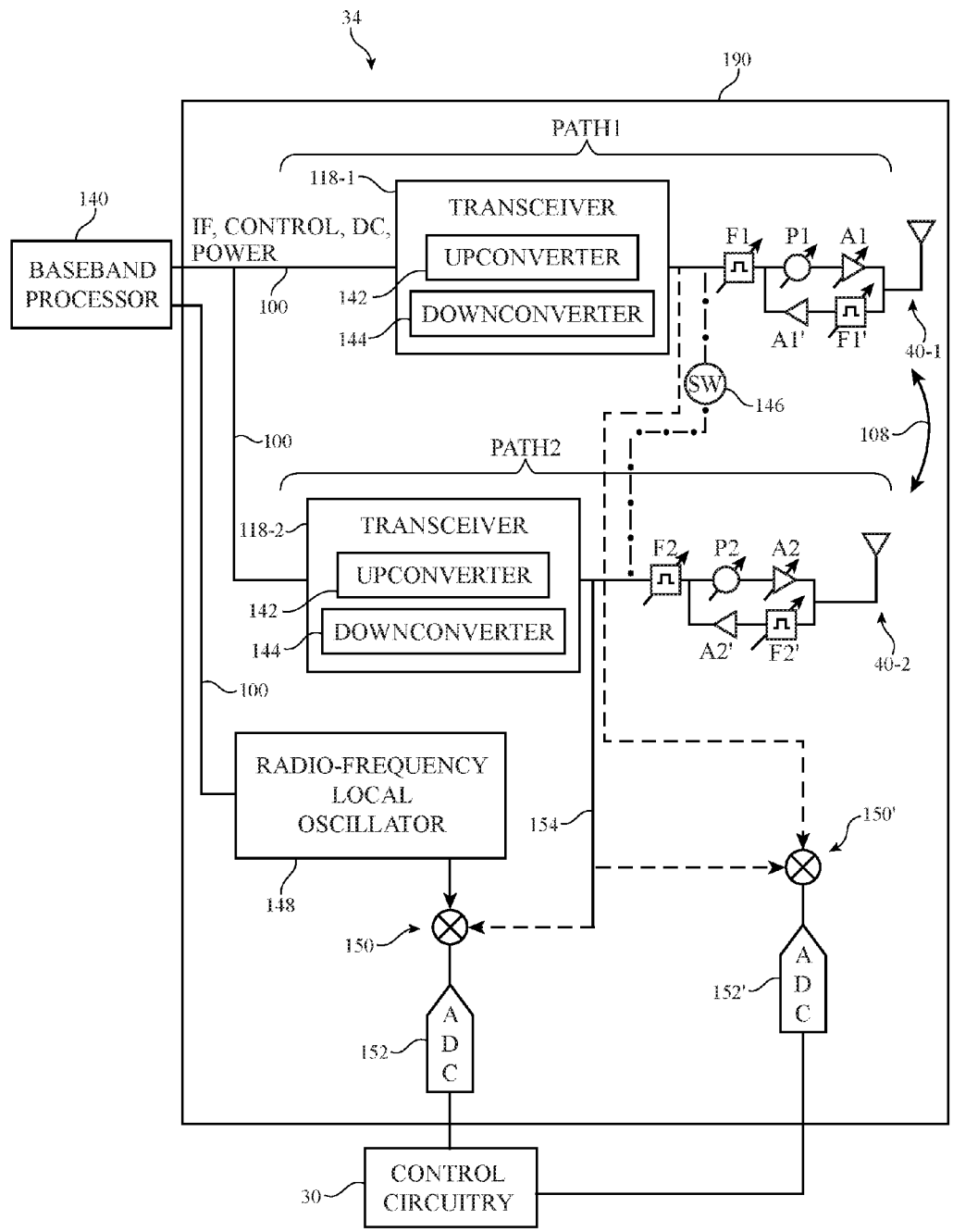
FIG. 7 is a diagram of another illustrative pair of signal paths with associated antennas that may be using in performing wireless characterization measurements in accordance with an embodiment.

Another illustrative configuration for wireless circuitry 34 is shown in FIG. 7. In the example of FIG. 7, baseband processor 140 is used to generate (and receive) antenna signals at intermediate frequencies IF. Paths 100 may be used to convey intermediate frequency signals IF or other antenna signals between baseband processor 140 and antenna signal paths (e.g., antenna signal paths in integrated circuit 190 or other wireless circuitry 34). Control signals (e.g., signals from baseband processor 140 or other control circuitry 30 and/or direct-current power signals) may also be distributed using paths 100.

Each signal path may include an associated antenna. For example, PATH1 may include antenna 40-1 and PATH2 may include antenna 40-2. Transceiver circuitry 118-1 and 118-2 may include transmitter and receiver circuits and upconverters 142 and downconverters 144. Upconverters 142 may convert IF signals to radio-frequency (RF) signals at higher frequencies. Downconverters 144 may convert RF signals to IF signals at lower frequencies. Path PATH1 may include circuits such as filters F1 and F1 (e.g., adjustable channel filters to block out-of-band signals), adjustable phase shifter P1, adjustable gain output amplifier A1, and input amplifier A1'. Path PATH2 may include circuits such as channel filters F2 and F2', adjustable phase shifter P2, adjustable gain amplifier A2, and amplifier A2'. In some embodiments, a switch such as switch 146 may be coupled between paths PATH1 and PATH2. To measure signals on one of the antenna paths (e.g., PATH2), signals may be tapped from that path (see, e.g., signal path 154) that are downconverted to direct-current (DC) frequencies by mixing these tapped signals with signals from radio-frequency local oscillator 148 using mixer 150 and digitizing these signals for analysis by control circuitry 30 using analog-to-digital converter 152. As an alternative, mixer 150' may mix signals from path 154 with signals from path 156 (e.g., signals tapped from another antenna signal path such as PATH1) and may digitize these signals for control circuitry 30 using analog-to-digital converter 152'.

Figure 8:
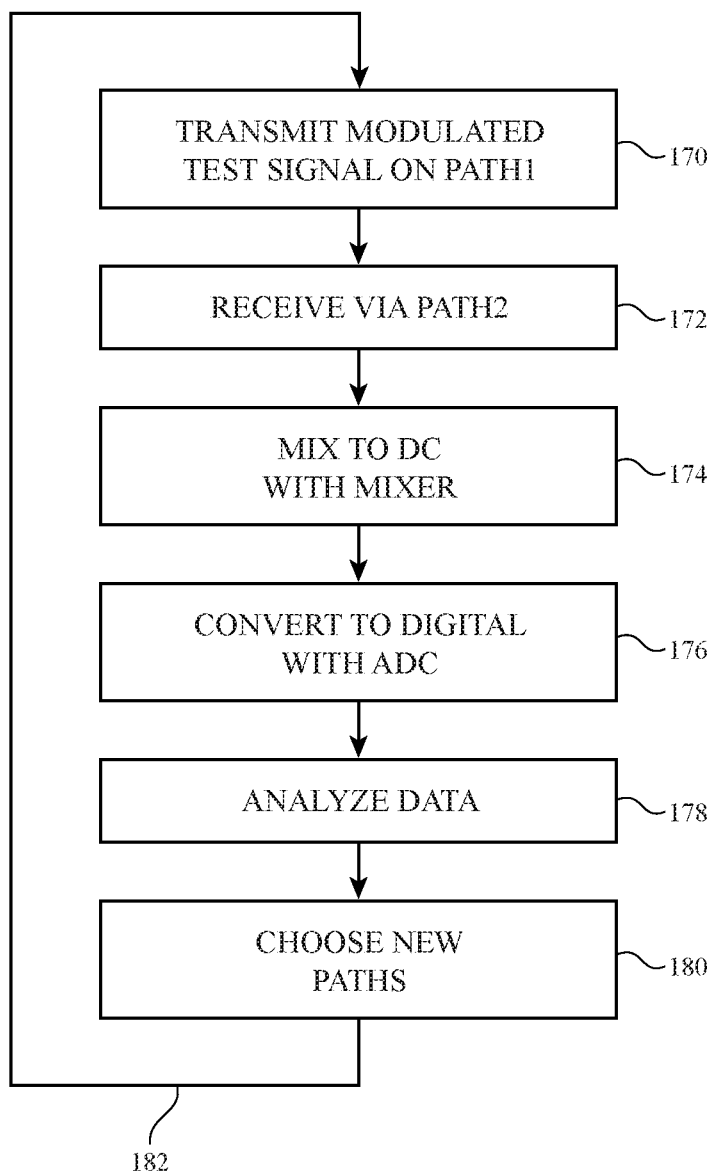
FIG. 8 is a flow chart of illustrative steps involved in performing wireless characterization measurements using wireless circuitry of the type shown in FIG. 7 in accordance with an embodiment.

A flow chart of illustrative steps involved in using wireless circuitry 34 of the type shown in FIG. 7 to perform wireless self-test measurements is shown in FIG. 8. As shown in FIG. 8, a signal such as a modulated test signal may be transmitted on path PATH1 at step 170. The transmitted signal may be transmitted over the air as over-the-air antenna signal 108 by antenna 40-1 and received by antenna 40-2 in PATH2 (step 172). At step 174, the received signal on path PATH2 may be mixed to DC with mixer 150 or 150' and converted to digital using analog-to-digital converter 152 or 152'.

As shown in FIG. 7, the portion of wireless circuitry 34 associated with paths PATH1 and PATH2 may be implemented on one or more integrated circuits such as antenna integrated circuit 190. If desired, test results information may be conveyed from integrated circuit 190 to control circuitry 30 using intermediate frequency (IF) signal paths such as paths 100. The received data may be analyzed using control circuitry 30 at step 178. For example, control circuitry 30 may determine bit error rates and may otherwise evaluate the performance of wireless circuitry 34. If desired, this process may be repeated (i.e., all of the antenna signal paths in circuitry 34 can be tested in a step-by-step fashion leveraging previously calibrated paths), as indicated by step 180 (in which a new antenna signal path for testing is selected) and line 182.

Figure 9:
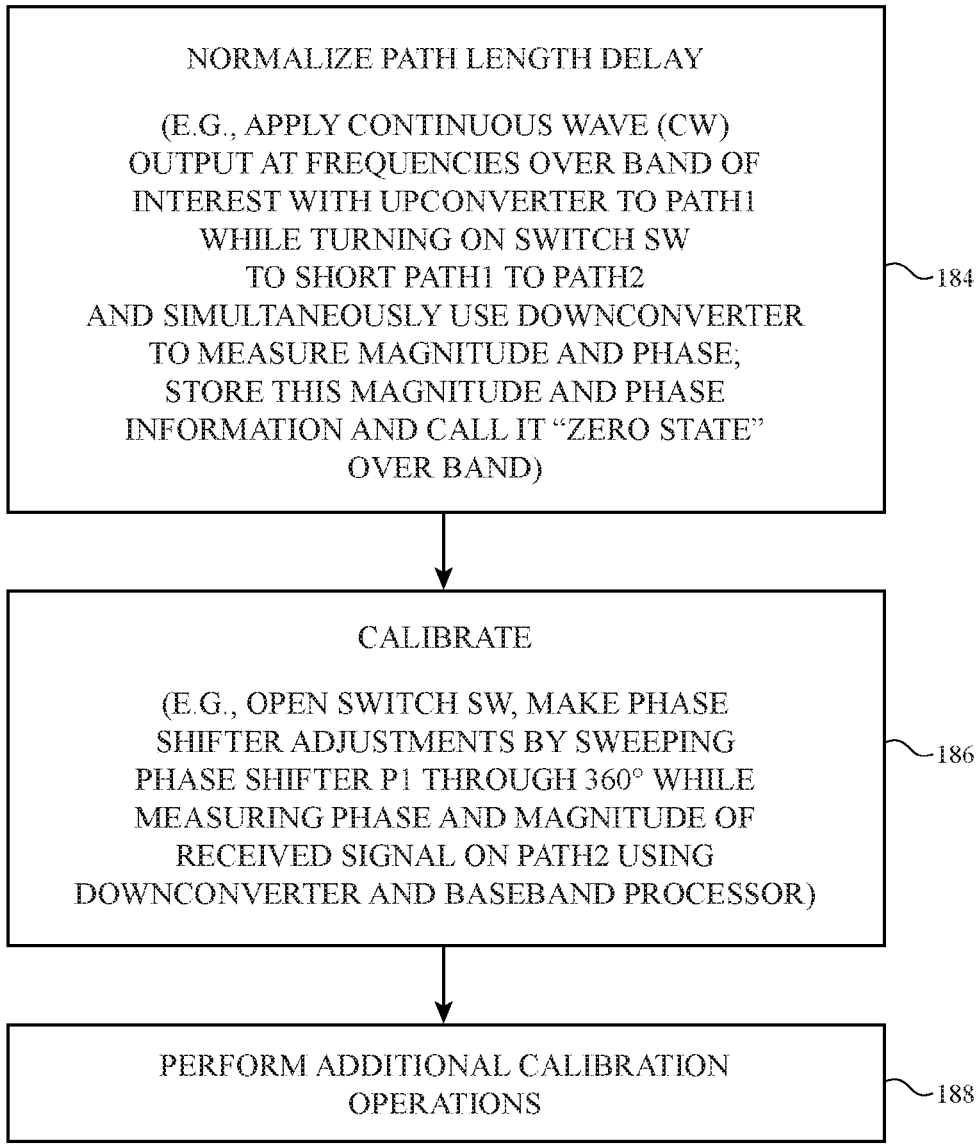
FIG. 9 is a flow chart of illustrative steps that may be involved in performing additional wireless characterization measurements using wireless circuitry of the type shown in FIG. 7 in accordance with an embodiment.

A flow chart of illustrative steps involved in using wireless circuitry 34 of FIG. 7 to perform additional wireless self-test measurements is shown in FIG. 9. In the example of FIG. 9, switch 146 of FIG. 7 is closed and opened. Initially, at step 184, control circuitry 30 normalizes the path length delay between paths PATH1 and PATH2 by closing switch SW. In particular, the upconverter 142 of path PATH1 is used to supply a continuous wave (CW) radio-frequency output signal over frequencies in a frequency band of interest to path PATH1 while switch SW is turned on to short path PATH1 to path PATH2. Phase shifter P2 (and other circuit components such as adjustable filters and amplifiers) may be left in a default setting (as an example). At the same time, the downconverter 144 of PATH2 is used by circuitry 30 to measure the magnitude and phase of signals received at transceiver 118-2. The magnitude and phase information that is measured by transceiver 118-2 in this way may be stored by control circuitry 30 (e.g., baseband processor 140 or other control circuitry in device 10) and used to define a zero state for each of the frequencies in the band of interest.

At step 186, calibration operations are performed using the known zero state. In particular, control circuitry 30 may open switch SW to force transmitted signals on PATH1 to be conveyed between PATH1 and PATH2 as over-the-air antenna signals 108 that pass from antenna 40-1 to antenna 40-2. While these signals are being transmitted by the transmitter in transceiver circuit 118-1 on PATH1 and received by the receiver in transceiver circuit 118-2 on PATH2, the components of PATH1 (phase shifter, adjustable gain amplifier, channel filter, etc.) may be adjusted to calibrate these components. As an example, the phase shift setting of phase shifter P1 may be adjusted from its default setting (e.g., 0°) through a full range of phase shifts (e.g., through a full 360° or more in phase). The resulting phase and magnitude of the received signals on PATH2 may be measured using the downconverter 144 and receiver of transceiver circuit 118-2). In this way, control circuitry 30 (e.g., baseband processor 14) may collect calibration data for phase shifter P1 (e.g., data that indicates how much phase shift is produced in path PATH2 for a given change in the setting of phase shifter P1 in PATH1). The calibration data may be stored in device 10 and, if desired, may be used to calibrate other devices 10 that include circuitry 34 (e.g., other devices 10 of the same type as device 10 that are being manufactured using the same type of components).

As indicated by step 188, additional antenna signal paths (and, if desired, additional components such as adjustable gain amplifiers, channel filters, etc.) may be calibrated by repeating the operations of steps 184 and 186 on additional antenna signal paths in a stepwise fashion.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   a housing;
   control circuitry in the housing;
   a plurality of antennas in the housing including at least a first and second antennas in respective first and second antenna signal paths; and
   wireless circuitry in the housing that includes transceiver circuitry that operates under control of the control circuitry to transmit and receive antenna signals over the first and second antenna signal paths using the first and second antennas, wherein the control circuitry is configured to use the wireless circuitry to transmit over-the-air antenna signals from the first antenna to the second antenna while measuring corresponding received antenna signals from the first antenna using the second antenna and transceiver circuitry in the second antenna signal path, and the control circuitry gathers impedance measurements using at least the corresponding received antenna signals.

2. The electronic device defined in claim 1 further comprising a switch between the first antenna signal path and the second antenna signal path that the control circuitry closes to normalize path length delay between the first and second antenna signal paths.

3. The electronic device defined in claim 2 further comprising an adjustable electrical component in the first antenna signal path that the control circuitry adjusts while measuring the corresponding received antenna signals from the first antenna to calibrate the adjustable electrical component.

4. The electronic device defined in claim 3 wherein the adjustable electrical component comprises a phase shifter that makes phase adjustments to transmitted signals in the first antenna signal path.

5. The electronic device defined in claim 3 wherein the adjustable electrical component comprises an adjustable gain amplifier that amplifies transmitted signals in the first antenna signal path.

6. The electronic device defined in claim 3 wherein the adjustable electrical component comprises an adjustable filter in the first antenna signal path.

7. The electronic device defined in claim 1 wherein the housing comprises a housing selected from the group consisting of: a laptop computer housing, a cellular telephone housing, and a tablet computer housing.

8. The electronic device defined in claim 1 further comprising:
   a first coupler in the first antenna signal path;
   a second coupler in the second antenna signal path; and
   a switch that gathers signals from the first and second couplers under control of the control circuitry to make S-parameter measurements on the first and second antenna signal paths.

9. The electronic device defined in claim 1 wherein the first and second antennas are part of a common phased antenna array.

10. The electronic device defined in claim 1 wherein the first and second antennas are part of first and second different phased antenna arrays.

11. The electronic device defined in claim 1 wherein the first and second antennas are located at respective first and second corners of the housing.

12. The electronic device defined in claim 1 wherein the first antenna is a millimeter wave antenna.

13. The electronic device defined in claim 12 wherein the second antenna is a millimeter wave antenna.

14. An electronic device, comprising:
   a housing
   control circuitry in the housing;
   a plurality of antennas in the housing including at least a first and second antennas in respective first and second antenna signal paths;
   wireless circuitry in the housing that includes transceiver circuitry that operates under control of the control circuitry to transmit and receive antenna signals over the first and second antenna signal paths using the first and second antennas, wherein the control circuitry is configured to use the wireless circuitry to transmit over-the-air antenna signals from the first antenna to the second antenna while measuring corresponding received antenna signals from the first antenna using the second antenna and transceiver circuitry in the second antenna signal path;
   a mixer that mixes a first signal with a second signal to produce an output; and
   an analog-to-digital converter that digitizes the output, wherein the second signal is received from the second antenna signal path.

15. The electronic device defined in claim 14 further comprising a radio-frequency local oscillator, wherein the first signal is received from the radio-frequency local oscillator.

16. The electronic device defined in claim 14 further comprising a signal path that routes the first signal to the mixer from the first antenna signal path.

17. A portable electronic device, comprising:
   a housing;
   a display in the housing;
   a plurality of antennas in the housing including at least a first and second antennas in respective first and second antenna signal paths; and
   wireless circuitry in the housing that transmits an over-the-air antenna test signal from the first antenna and that receives the transmitted over-the-air antenna test signal from the first antenna with the second antenna, wherein the first antenna signal path includes an adjustable electrical component that is adjusted by control circuitry while receiving the antenna test signal with the second antenna, and the control circuitry analyzes the antenna test signal received with the second antenna to produce calibration data.

18. A portable electronic device, comprising:
   a housing;
   a plurality of phased antenna arrays in the housing, wherein the phased antenna arrays include at least first and second antennas;
   wireless circuitry in the housing that transmits an over-the-air antenna signal from the first antenna and that receives the transmitted over-the-air antenna signal from the first antenna with the second antenna; and
   control circuitry that tests at least the first antenna by analyzing the antenna signal received with the second antenna, wherein the phased antenna arrays comprise millimeter wave phased antenna arrays and wherein the antenna signal received with the second antenna comprises a millimeter wave antenna signal.

* * * * *